July 24, 1928.  
R. W. DAVIS  
VEHICLE SPRING  
Original Filed July 13, 1923
1,678,035
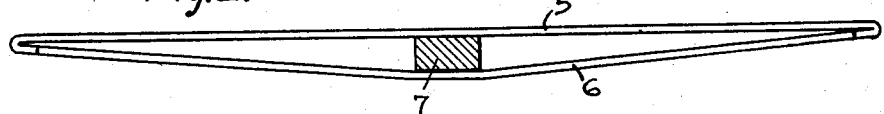
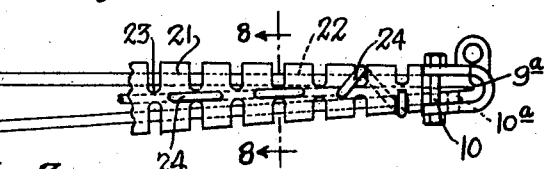
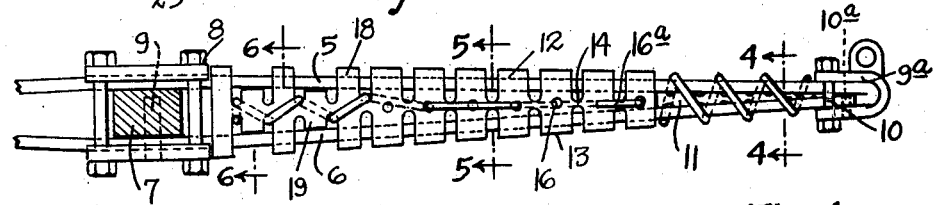
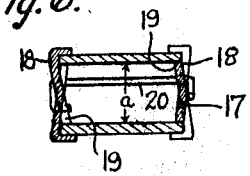   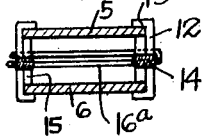   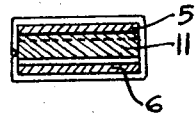
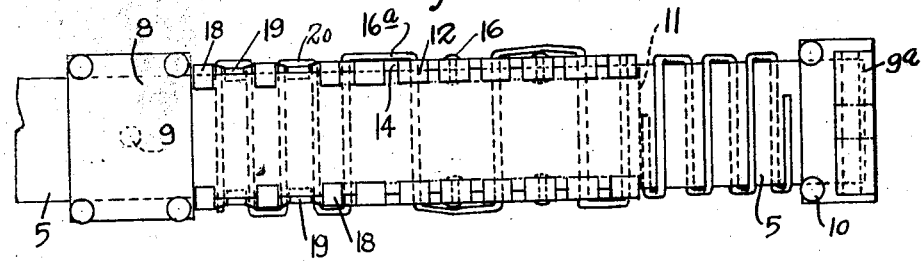
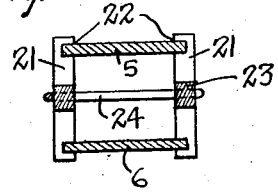
INVENTOR
ROBERT W. DAVIS
BY John J. Lynch
ATTORNEY Patented July 24, 1928.

1,678,035

UNITED STATES PATENT OFFICE.

ROBERT W. DAVIS, OF NEW YORK, N. Y., ASSIGNOR TO HIMSELF AND ZENO LITTMAN, OF NEW YORK, N. Y.

VEHICLE SPRING.

Application filed July 13, 1923, Serial No. 651,252. Renewed November 25, 1927.

This invention relates to springs and in particular to shock absorbing springs as applied to vehicles, particularly of the automotive type.

An object of the invention is to provide a spring having two leaves, one of which will act as the tension element, and the other of which will act as the compression element.

A further object is to provide a spring of the character referred to in which the two leaves will be held a definite distance apart at all times.

A further object is to provide a spring, the anchor pins of which will pass through the compression member and not through the tension member.

A still further object is to produce a spring having diverging leaves so that as the load arm moment increases, the resisting moment also increases due to said divergence of the spring leaves.

At any cross-section of my spring, the resisting moment bears the same ratio to the load moment as at any other cross-section thereof, which means that the tension and compression fibers are loaded uniformly from end to end throughout their length which is not the case in the common spring. There the load carrying fibers are loaded more at the ends of the next lower leaf than elsewhere. Proof of this is seen, as springs invariably break at this point.

Another object therefore is to produce a spring in which all elastic fibers can be stressed nearly alike.

Another object is to produce a spring which is a cantilever or simple beam whereby tension of one element causes compression of the other and vice versa.

Another object is to provide a spring in which tension and compression fibers are separated into two leaves.

Another object is to eliminate the elastic metal of the neutral zone and thereby save the weight of steel used.

In the drawings in which I have shown several important embodiments of my invention;

Figure 1 is a side elevation of a double leaf spring, shown diagrammatically;

Figure 2 is a side elevation of a single piece leaf spring, the holding bracket and shackles being shown fastened thereto;

Figure 3 is a side elevation of half of the double leaf spring as shown in Figure 1 with the axle bracket, and shackle and different filling members being applied thereto.

Figure 4 is a section taken on line 4—4 of Figure 3;

Figure 5 is a section taken on line 5—5 of Figure 3;

Figure 6 is a section taken on line 6—6 of Figure 3;

Figure 7 is a top plan view of the spring as seen in Figure 3; and

Figure 8 is a section through Figure 2 on the line 8—8.

Referring more particularly to the drawing and to Figures 1, 3, 4, 5, 6 and 7, the numeral 5 indicates the upper or tension leaf of a double leaf spring construction, the lower or compression leaf being designated by 6. These leaves are flat pieces of steel which at their centers are separated by the car axle or suitable spacer 7, and held thereto by a suitable anchorage 8, which as shown in Figure 7, consists of a top and bottom plate held together by bolts which are so placed that they pass from plate to plate alongside the edges of the spring leaves 5 and 6. The lower plate is provided with a central anchor pin 9 which passes up through the bottom leaf 6 and into the axle 7. Each of the plates may be suitably channelled to receive the spring leaves; so as to prevent sidewise slippage thereof. The ends of the springs are engaged by shackles $9^a$, the bolts 10 thereof acting upon the shackle to provide a clamp for the spring ends. It will be noted that the ends of spring leaf 5 are bent upon themselves within the shackle $9^a$ and abut against the ends of the spring leaf 6 which is the compression member and which is engaged only by a pin $10^a$ which is held in the bottom of the shackle. This pin extends only into spring 6 and does not enter spring 5. The bolts are disposed adjacent the outer edges of the spring leaves 5 and 6.

The different types of spacers or separators as they may be better termed are adapted to be used as distance "$a$" shown in Figure 6 varies, that is where "$a$" is from zero to one quarter inch a wedge 11 of aluminum is inserted between the leaves 5 and 6 and bound therein with wire, while the next adjacent separator comprises as shown in Figure 5 plate members 12 having their ends bent over as at 13 to engage the outsides of the top and bottom leaves, the members being joined by constricted portions 14; there being similar separators on both sides of the spring, it being understood that the constricted portions 14 in the spacers are necessary due to the fact that the leaf members and spacing elements are to be deflected in operation. The leaf members are held not in fixed relation but in fixed spaced relation, or a fixed distance apart. Between the leaves and engaging the inner faces thereof are auxiliary plates 15 which are riveted to the plate members 12, as by rivets 16. A suitable tie wire 16ª is used to hold the plate members against the edges of the spring.

Beyond the plate members 12 are placed other plate members 17, which are punched to provide alternate sections, the sections 18 being bent as are members 12 to provide hook portions which engage the outer faces of leaves; while the sections 19 are bent inwardly so that their ends just engage the under faces of the leaves. The metal between the sections 18 and 19 is constricted and a wire binder 20 passes from side to side to hold the plate members against the side edges of the spring leaves.

These separators not only prevent any movement toward each other of the spring members but they also prevent any movement away from each other. The leaf members need not slide through the spacers since the latter deflect as the spring deflects.

In Figures 2 and 8 I have shown another method of holding the parts of a single piece leaf spring in fixed relation which comprises oppositely disposed plates 21 having milled grooves 22 therein in which the edges of the spring leaves 5 and 6 are disposed, the plates having restricted portions 23 and being joined by the tie wire 24 as shown. In this form the spring is a single piece of steel, the ends thereof being slightly spaced beneath the axle to abut against a projected portion 25 of axle or spacer.

It will thus be seen that I have provided a spring of two elastic parts or members which diverge and are held in fixed spaced relation. The anchor pins thereof do not pass through both parts of the spring but only through the compression member. Also, as the load arm moment increases, so does the resisting moment due to the divergence of the leaves.

I have also, it can be seen, provided a leaf spring, the leaves of which can be hardened and tempered straight, not curved.

What I claim is:

1. A spring comprising a plurality of leaves subjected to separate stresses of tension or compression, and means for holding said leaves definite distances apart thruout their lengths.

2. A spring comprising a plurality of leaves, each subjected solely to a tension or a compression stress, and anchor pins for retaining said leaves in proper relation, said anchor pins passing through the leaf subjected to compression only.

3. A spring consisting of two leaf members which act as separate tension and compression elements, means for holding said leaf members in spaced association with each other thruout their lengths, and anchoring means adapted to pass through the compression element of said spring.

4. A spring consisting of two leaf members, each subjected to a separate stress of tension or compression, a clamp holding said members in contact with a vehicle axle, shackles associated with said members, and separators adapted to engage said members to hold the same in fixed relation thruout their lengths.

5. A spring consisting of a plurality of leaf members subjected to separate stresses of tension or compression, said members being of uniform cross-section thruout and having a constant divergence one to the other in a working plane common thereto, whereby the load resisting moment increases as the load arm moment increases.

6. A leaf spring, portions of which diverge in a working plane common thereto, and means for holding said spring in relation to a vehicle axle whereby when the spring is under a load, one of the diverging portions is under tension only while the other of said portions is solely under compression.

7. A spring consisting of two leaves, one of which acts as a compression element and the other as a tension element, means for holding said leaves in divergence to one another, wedge members between said leaves at their outer points of divergence, and means for preventing said leaves from moving toward each other.

8. A leaf spring, means for mounting said spring upon a vehicle axle, said spring having portions which diverge in a working plane common thereto, and separators thruout the lengths of said diverging portions whereby the same at all times are maintained in fixed relation.

9. A spring consisting of two diverging leaves, one of said leaves carrying all of the tension and the other all of the compression stresses.

10. A leaf spring consisting of two divergent portions subjected to separate tension or compression stresses, all fibers in each of said portions bearing nearly equal loads.

11. A leaf spring consisting of two divergent portions, one to carry the tension alone and the other to carry the compression only; the tension portion having the ends thereof bent back upon itself forming an abutment for the extremity of the compression portion.

12. A leaf spring consisting of two divergent portions, one to carry the tension only and the other to carry solely the compression; the end of the tension portion being bent back to meet the compression portion and participating in the same stress as the latter.

13. A leaf spring consisting of two divergent portions, subjected to separate tension or compression stresses, and means for securely holding said diverging portions at definite distances apart thruout their lengths.

14. A leaf spring consisting of two portions, one portion adapted to carry the tension alone and the other to carry the compression only, said portions diverging uniformly so that the ratio of resisting moment to load moment is equal at all cross sections of the said portions.

15. A leaf spring consisting of two portions, one portion to carry the tension alone and the other to solely carry the compression, said portions diverging so that the stresses are equal in them throughout their length.

16. A spring structure comprising a tension member, a compression member, a clamp surrounding adjacent ends of the members, a pin securing the clamp in place, the pin passing through the compression member only.

17. A spring comprising a plurality of members, the members being in close proximity to each other at their ends, and being spaced apart at their intermediate portions, the adjacent ends of the members being held in fixed relation.

18. A spring comprising a plurality of members, the members being in close proximity to each other at their ends and being spaced apart at their intermediate portions, the adjacent ends of the members being held in fixed relation, and spacing means for holding the members apart throughout their entire lengths.

19. A spring comprising two load-carrying members, the members being in close proximity to each other at their ends and being spaced apart at their intermediate portions, and means for holding the adjacent ends of the members against relative movement.

20. A spring comprising two-load carrying members, the members being in close proximity to each other at their ends and being spaced apart at their intermediate portions, clamping means for holding the adjacent ends of the members against relative movement, and spacing means for holding the members apart throughout their entire lengths.

In testimony whereof, I have signed my name to this specification this 6th day of July, 1923.

ROBERT W. DAVIS.